(12) United States Patent
Oster et al.

(10) Patent No.: US 10,914,111 B2
(45) Date of Patent: Feb. 9, 2021

(54) SPINDLE DRIVE APPARATUS

(71) Applicant: Stabilus GmbH, Koblenz (DE)

(72) Inventors: Peter Oster, Koblenz (DE); Andreas Ritter, Hilgert (DE)

(73) Assignee: Stabilus GmbH, Koblenz (DE)

( * ) Notice: Subject to any disclaimer, the term of this patent is extended or adjusted under 35 U.S.C. 154(b) by 134 days.

(21) Appl. No.: 16/043,697

(22) Filed: Jul. 24, 2018

(65) Prior Publication Data

US 2019/0032389 A1    Jan. 31, 2019

(30) Foreign Application Priority Data

Jul. 26, 2017  (DE) .................... 10 2017 212 823

(51) Int. Cl.
*F16H 25/20*  (2006.01)
*E05F 15/622*  (2015.01)
(Continued)

(52) U.S. Cl.
CPC .......... *E05F 15/622* (2015.01); *F16H 25/20* (2013.01); *F16H 25/2021* (2013.01); *F16H 25/24* (2013.01); *F16H 57/021* (2013.01); *E05Y 2900/546* (2013.01); *F16H 1/16* (2013.01); *F16H 2025/209* (2013.01); *F16H 2025/2031* (2013.01); *F16H 2025/2037* (2013.01); *F16H 2025/2084* (2013.01); *F16H 2057/02034* (2013.01)

(58) Field of Classification Search
CPC .... E05F 15/622; F16H 25/20; F16H 25/2021; F16H 25/24; F16H 57/021; F16H 1/16; F16H 2025/2031; F16H 2025/2037; F16H 2025/2084; F16H 2025/209; F16H 2057/02034; E05Y 2900/546
See application file for complete search history.

(56) References Cited

U.S. PATENT DOCUMENTS 6,202,803 B1 *  3/2001  Lang ................. F16D 55/28
                                        188/134
6,377,010 B1 *  4/2002  Roither ............... A47B 9/10
                                        310/80
(Continued)

FOREIGN PATENT DOCUMENTS

DE   20 2016 106 011    11/2016
EP         2975297       1/2016

OTHER PUBLICATIONS

German Search Report for German patent application No. 10 2017 212 823.2, dated Mar. 21, 2018, 9 pages.
(Continued)

*Primary Examiner* — Zakaria Elhamadi
(74) *Attorney, Agent, or Firm* — Rankin, Hill & Clark LLP

(57) ABSTRACT

A spindle drive apparatus includes a spindle, a spindle nut, a drive assembly with a drive unit, which is adapted for driving the spindle or the spindle nut, an output shaft of the drive unit and a drive assembly housing, in which the drive assembly is housed, at least one bearing, a coupling element, which prevents a displacement of elements houses therein from each other, wherein the drive assembly housing is free from forces, which are transmitted from one of the superordinate assemblies through the spindle drive apparatus to the other of the superordinate assemblies.

13 Claims, 7 Drawing Sheets

(51) Int. Cl.
  *F16H 25/24* (2006.01)
  *F16H 57/021* (2012.01)
  *F16H 1/16* (2006.01)
  *F16H 57/02* (2012.01)

(56) References Cited

U.S. PATENT DOCUMENTS

| | | | | |
|---|---|---|---|---|
| 7,066,041 B2* | 6/2006 | Nielsen | ................ | A47C 20/041 74/425 |
| 8,015,890 B2* | 9/2011 | Christensen | ........ | F16H 25/2021 192/56.62 |
| 2006/0270330 A1* | 11/2006 | Schmid | .................... | F16H 25/20 452/58 |
| 2008/0061643 A1* | 3/2008 | Bochen | .................... | H02K 7/06 310/78 |
| 2008/0134815 A1* | 6/2008 | Larsen | .................... | F16H 25/20 74/89.34 |
| 2009/0050451 A1* | 2/2009 | Sorensen | ................ | F16H 25/20 200/61.85 |
| 2009/0120003 A1* | 5/2009 | Bochen | .................... | B60J 5/102 49/340 |
| 2010/0186528 A1* | 7/2010 | Hillen | .................... | F16D 7/048 74/89.23 |
| 2011/0290050 A1* | 12/2011 | Kummer | ................ | E05F 15/622 74/89.37 |
| 2012/0125399 A1* | 5/2012 | Schatz | .................. | F16H 25/186 136/246 |
| 2012/0137803 A1* | 6/2012 | Bochen | ................ | F16H 25/2015 74/89.32 |
| 2012/0222509 A1* | 9/2012 | Winther | .................... | H02K 7/06 74/89 |
| 2012/0222510 A1* | 9/2012 | Winther | .................. | F16H 25/20 74/89.23 |
| 2014/0202271 A1* | 7/2014 | Oberndorfer | ............. | H02K 7/06 74/89.37 |
| 2014/0312725 A1* | 10/2014 | Oberndorfer | ........ | A47C 20/041 310/80 |
| 2017/0248210 A1* | 8/2017 | Muller | .................... | F16H 25/24 |
| 2017/0292311 A1* | 10/2017 | Podkopayev | .......... | E05F 15/622 |
| 2018/0038472 A1* | 2/2018 | Heipt | ...................... | F16H 25/20 |
| 2018/0223583 A1* | 8/2018 | Podkopayev | .......... | E05F 15/622 |
| 2018/0273123 A1* | 9/2018 | Eberlberger | ............ | B62K 19/36 |
| 2019/0169901 A1* | 6/2019 | Yamagata | ................ | E05F 1/04 |

OTHER PUBLICATIONS

European Search Report for European patent application No. 18185385.4, dated Nov. 27, 2018, 7 pages.

* cited by examiner

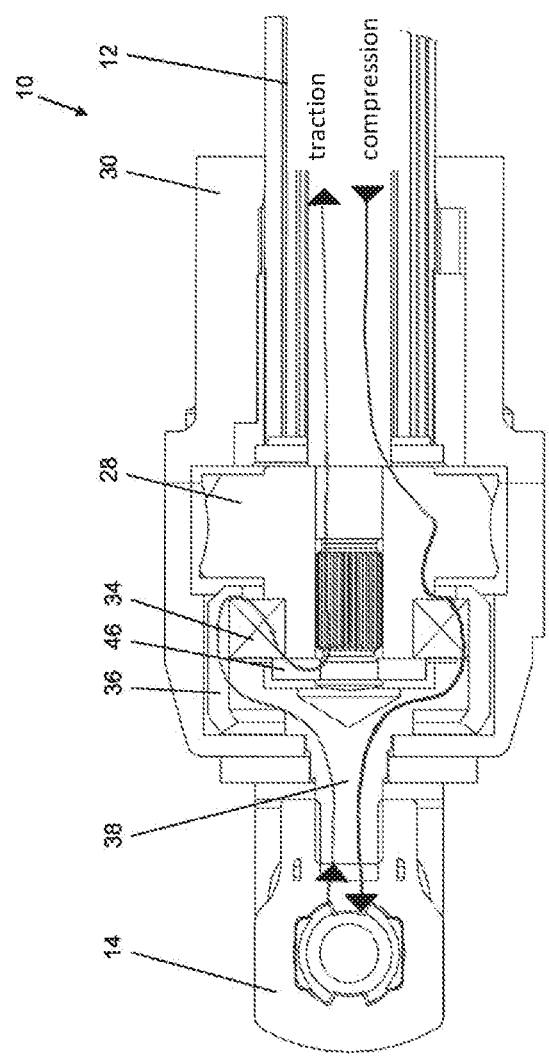

SPINDLE DRIVE APPARATUS

The present invention refers to a spindle drive apparatus, such as those used for opening and closing doors and/or tailgates of motor vehicles.

The spindle drive apparatuses generally known in the market are usually configured in such a way that a spindle is connected to a longitudinal end of the spindle drive apparatus and a spindle nut threadedly engaged with the spindle is connected to the other longitudinal end of the spindle drive apparatus. Both longitudinal ends are connected to a respective superordinate assembly, i.e. an assembly which does not belong to the spindle drive apparatus. When the spindle performs a rotation, the distance between both longitudinal ends is increased or reduced, depending on the direction of rotation. The spindle is driven by a drive unit, which is enclosed in a drive assembly housing positioned at the spindle. The drive assembly housing is positioned in such a way that in case of an extension or contraction of the spindle drive apparatus, and a corresponding displacement of the superordinate assemblies from or to each other, it absorbs at least part of the tensile and/or compressive forces, which act from the one superordinate assembly through the spindle drive apparatus on the other superordinate assembly. Therefore, the drive assembly housing has to be correspondingly stable and has to be enclosed in the force flow through the spindle drive apparatus. Thus, the production effort and costs are increased in these spindle drive apparatuses.

The object of the invention is thus to remove these drawbacks.

This object is achieved according to the invention by a spindle drive apparatus comprising a spindle provided with an external thread, which is connected to a first connection unit for connecting the spindle drive apparatus to a superordinate assembly, i.e. an assembly which does not belong to the spindle drive apparatus, a spindle nut, which is in threaded engagement with the external thread of the spindle, which is connected to a second connection unit for connecting the spindle drive apparatus to a superordinate assembly, i.e. an assembly which does not belong to the spindle drive apparatus, a drive assembly with a drive unit, which is configured for driving the spindle or the spindle nut, a drive shaft of the drive unit and a drive assembly housing, in which the drive assembly is housed, at least one bearing, which rotatably supports the spindle or the spindle nut with respect to the drive assembly housing, and a coupling element, which connects the first connection unit to the spindle or the second connection unit to the spindle nut, in such a way that a displacement of both respective elements from each other in at least one axial direction of the spindle is prevented, wherein the drive assembly housing is free from forces which are transmitted from one of the superordinate assemblies through the spindle drive apparatus to the other of the superordinate assemblies.

Already at this point it should be noted that the inventive characteristic, that "the drive assembly housing is free from forces, which are transmitted from one of the superordinate assemblies through the spindle drive apparatus to the other of the superordinate assemblies" refers to those forces, which occur in the form of axial forces due to the own weight of one of the superordinate assemblies, such as a tailgate of a vehicle, or due to a manual intervention by a user, such as when operating the tailgate of the vehicle, in the spindle drive apparatus, and in the case of spindle drive apparatuses known in the art also in the drive assembly housing, and which are generated by the drive unit for driving the spindle drive apparatus, may also be absorbed by the drive assembly housing in the inventive spindle drive apparatus.

The drive assembly housing of the inventive spindle drive apparatus may thus have a thinner configuration with respect to drive assembly housings according to the state of the art. It is obvious that the drive assembly housing of the inventive spindle drive apparatus also has to fulfil a safety function of the components housed in the drive assembly housing with respect to externally acting forces. This requirement may however be fulfilled, for example, by a drive assembly housing, which is only partially reinforced, such as in the region of the drive unit. Since the drive assembly housing according to the invention is not integrated in the force flow between both connection units, also the tolerance relative to the production of the drive assembly housing and to its arrangement at the spindle drive apparatus may be reduced. Through these measures the production costs of the spindle drive apparatus may effectively reduced.

Due to the fact that, as already mentioned, the drive assembly housing according to the invention is not incorporated in the force flow between both connection units, it is possible that the drive assembly housing in use is subject to reduced deformations with respect to known spindle drive apparatuses, whereby a higher bearing precision of the drive unit relative to a respective element to be drive, such as the spindle or the spindle nut, may be achieved. Due to the higher precision of the support, noises due to support inaccuracies may be reduced or even entirely prevented.

The coupling element may be formed by an element, which is separate from the drive assembly housing.

The coupling element may be made of metal, for example, and in particular steel or a zinc die cast.

The coupling element may also be essentially cylindrical, while other polygonal shapes of the coupling elements may also be conceived.

The drive unit may advantageously be formed by an electric motor. However, hydraulic or pneumatic drive units may also be conceived.

It is to be noted, at this point, that the spindle drive apparatus may also comprise a spring element, such as a compression spring or a traction spring, which is configured for storing energy in case of a relative displacement of both longitudinal ends of the spindle drive apparatus in one direction, which energy is again released in case of a relative displacement of both longitudinal ends of the spindle drive apparatus in the opposite direction, so that the power required by the drive unit for displacing both longitudinal ends of the spindle drive apparatus in this direction may be reduced. In particular, the spring element may support the spindle drive apparatus during the lifting of a superordinate assembly, i.e. when acting against the gravitational force. Thus, the characteristic, that forces are transmitted from one of the superordinate assemblies through the spindle drive apparatus to the other of the superordinate assemblies, has to be construed in the context of the present invention in the sense that they also comprise forces, which act on the spindle drive apparatus due to the energy stored in the spring element.

In order to improve the operating properties of the spindle drive apparatus, in particular in a spindle drive apparatus, in which the spindle is driven, the spindle drive apparatus may comprise at least two bearings which support the spindle or the spindle nut relative to the first or second connection unit, wherein a bearing may be a stationary bearing and the other bearing may be a loose bearing.

The coupling element may advantageously connect the first connection unit or the second connection unit to the at least one bearing, wherein the bearing may be connected to the spindle or the spindle nut in an axially undisplaceable way.

The coupling element thus may absorb traction and/or compression forces, which act on the bearing by thrusting or pulling the spindle or the spindle nut with respect to the bearing and may transmit these forces to the first connection unit or the second connection unit and through these to the corresponding superordinate assembly. To this end, the coupling element may be connected to the bearing on its external circumference. If the bearing is a ball bearing, then the inner bearing ring may be connected to the spindle or the spindle nut, and the external bearing ring may be connected to the coupling element. The coupling element may represent an axial securing of the bearing relative to the respective connection unit, such as a clip or a cage. The connection unit may have a collar or a base, which may be engaged by the coupling element.

In an embodiment of the invention, the coupling element may be provided with at least an inwardly protruding protrusion, which is configured for axially securing components which are housed within the coupling element. The protrusion may be provided for example by a forming method. In particular, the at least one inwardly protruding protrusion may be a radially inwardly protruding ring provided on one of the longitudinal ends of the coupling element, so that no additional elements are required for forming the protrusion.

The coupling element may advantageously comprise at least one spring ring, which is configured for axially securing components houses within the coupling element. In particular the coupling element may have both an inwardly protruding protrusion and a spring ring, so that components of the spindle drive apparatus may be introduced into the coupling element, until they contact the protrusion of the coupling element, for example, and subsequently may be axially secured by the spring ring in a direction opposed to the insertion direction of the components into the coupling element. The spring ring may engage into a groove, which is arranged on an internal side of the coupling element, such as it completely encircles this internal side.

Alternatively, the spring ring may also be replaced by a deformation of the coupling element after inserting the component into the coupling element.

In the inventive spindle drive apparatus, the output shaft of the drive unit may be essentially perpendicular to the spindle. Spatial conditions favoring this variant may be found in tailgates of motor vehicles, for example. In this case, the drive unit may be advantageously positioned essentially in parallel to the swiveling axis of the tailgate. It is obvious that within the context of the present invention the output shaft of the drive unit may also be parallel to the spindle of the drive apparatus.

In order to ensure that the inventive spindle drive apparatus may be mounted between two superordinate assemblies, such as a tailgate and the body of a vehicle, in order to cause, by varying the length of the spindle drive apparatus, a swiveling of both assemblies around a rotation axis, the first connection unit may be rotatably mounted relative to the spindle and/or the second connection unit may be rotatably mounted relative to the spindle nut. Depending on which of the spindle or the spindle nut in the inventive spindle drive apparatus is rotated by the drive unit, the corresponding non-driven component may be fixedly connected to the corresponding connection unit. It is obvious that both the first and second connection unit may be rotatably arranged on the spindle drive apparatus.

The drive assembly housing may be formed by a plurality, in particular two housing components, which may be connected to each other in such a way that the drive assembly housing surrounds the drive assembly, the coupling element and at least a portion of the spindle. The drive assembly housing may thus be inserted, in particular, at the portion, at which it surrounds the coupling element, in a direction parallel to the spindle, on a corresponding longitudinal end of the spindle drive apparatus, and subsequently screwed to a further housing component, for example, for securing the drive assembly housing to the spindle drive apparatus. Since the drive assembly housing according to the present invention is not required to absorb any force caused by the operation of the spindle drive apparatus, except for the already mentioned one, while only protecting the components housed in the drive assembly housing against dirt or/and damages, it may be configured very freely in the portion surrounding the spindle and the coupling element. Thus, the housing parts of the drive assembly housing may also be inserted into each other or glued to each other, for example, without the need for a particular force fit between the parts of the drive assembly housing.

In particular, the spindle may comprise a support element, which is connected to the spindle, in particular by riveting, and which axially secures the bearing relative to the spindle. This may represent a particularly simple and cost-effective axial securing of the bearing, and beyond the bearing also of the coupling element relative to the spindle. In particular, the spindle may be deformed into the shape of a cap, in order to secure the support element, which is disc-shaped, for example, to the spindle. The bearing houses within the coupling element may thus be radially inwardly connected to the support element and radially outwardly to the coupling element. Thus, a traction force acting between the spindle and the connection unit adjacent the coupling element may be transmitted from the spindle through the support element to the bearing, from there to the coupling element and from there to the connection unit. In the case of the already mentioned ball bearing, the support element may be connected to a radially inner ring of the ball bearing, whereas a radially outer ring of the ball bearing is connected to the coupling element.

The spindle drive apparatus may comprise a drive gear, onto which the drive unit acts in a way that a rotation of the drive gear rotates the spindle or the spindle nut. The drive gear may be connected to the spindle in order to transmit a torque, such as a form fit via a splined shaft or similar.

In particular, the drive gear may be a worm gear threadedly engaged with a worm shaft connected to the output shaft. The thus formed worm gear stage for reducing the rotational speed of the output shaft of the drive unit is characterized by a low noise output.

The spindle drive apparatus may comprise an intermediate element, which, on one hand, is connected to the spindle or the spindle nut and, on the other hand, to the drive gear, and which is configured for transmitting a torque of the drive gear to the spindle or spindle nut. Between the intermediate element and the drive gear a simple friction fit or a preloaded form fit may be provided, so that at this point an overload clutch may be formed, i.e. such as in case of blocking of the spindle or of the spindle nut and continuing movement of the drive gear, a slippage may occur between the intermediate element and the drive gear. Thus, the spindle drive apparatus, and in particular the drive unit, may be protected against damages due to overloading.

The intermediate element may also be adapted for housing at least one bearing at its external circumference. Thus, the intermediate element may be used as an adapter between a spindle or spindle nut optimized for the predetermined function of the spindle drive apparatus, and for bearing of standardized sizes. The use of standard bearings may have an additional positive effect on the production costs of the inventive spindle drive apparatus.

The intermediate element may be provided with at least one protrusion extending radially towards the outside, which is adapted for axially securing a bearing or/and the drive gear. A bearing may thus be secured, for example, at its radially inner side between the protrusion of the intermediate element and a protrusion of the spindle or spindle nut. Alternatively, or additionally, a bearing, which is housed on the intermediate element, may be secured on its radially inner side by the protrusion of the intermediate element and on the other hand by said support element or by an edge of the spindle itself. By forming the intermediate element with corresponding protrusions, a simple securing of the bearing (s) may be obtained.

Finally it should be noted that the spindle may advantageously made of metal, in particular steel, the spindle nut of plastics, in particular POM, the drive assembly housing of plastics, in particular PBT/PBTGF, the support element of metal, in particular steel, the drive gear of plastics, in particular POM, the coupling element of metal, in particular steel, and the connection unit of plastics, in particular POM.

The invention is explained in the following by means of the attached drawings.

In particular:

FIG. 1b shows the lateral cross-sectional view of FIG. 1a, wherein the force flow of traction and compression forces transmitted through the spindle drive apparatus is shown;

Figure 1A:
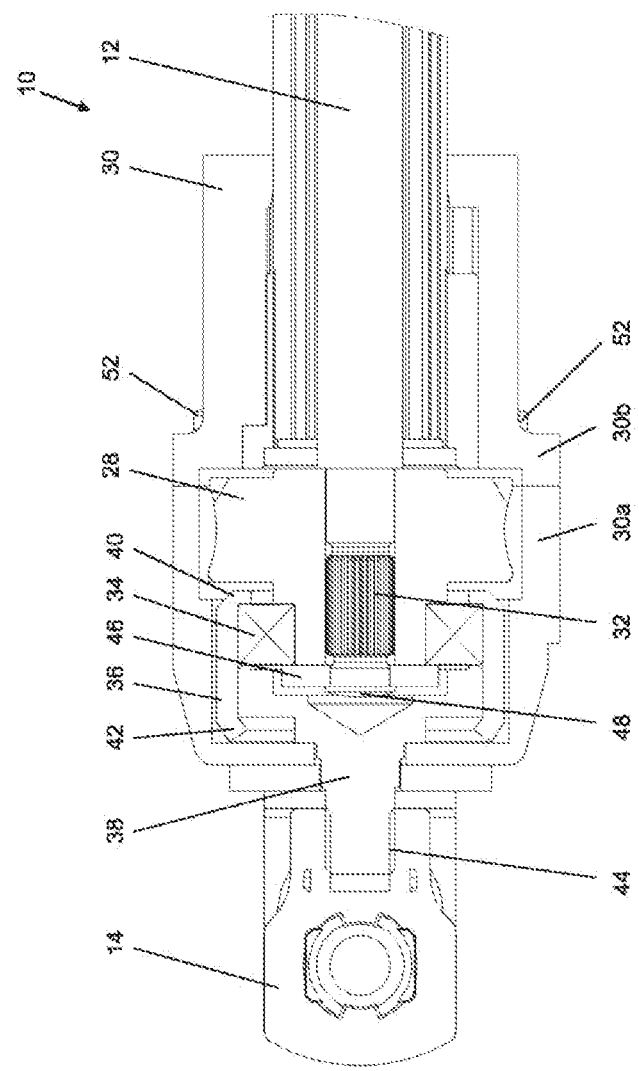
FIG. 1a shows a lateral cross-sectional view of a detail of the inventive spindle drive apparatus in a first embodiment.

In FIG. 1a, an inventive spindle drive apparatus is generally shown in 10.

Figure 2:
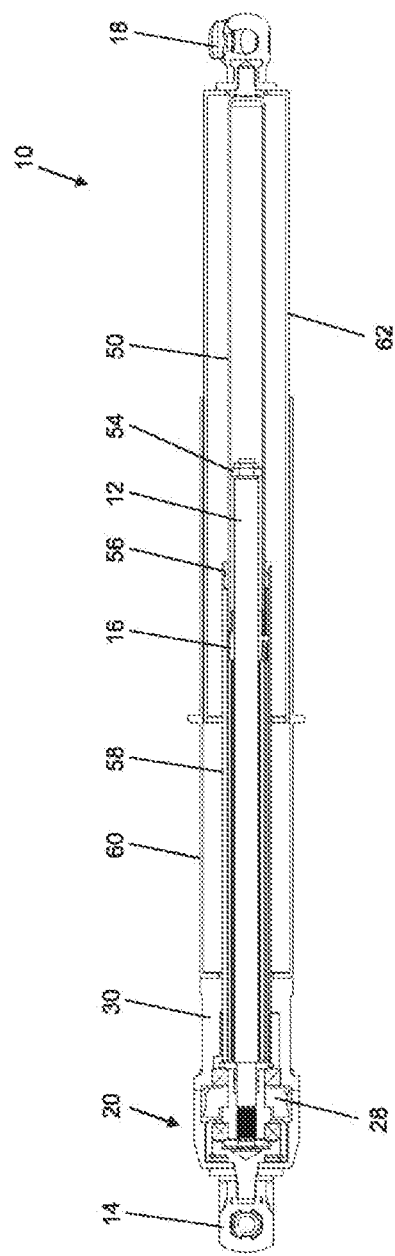
FIG. 2 shows a lateral cross-sectional view of the spindle drive apparatus.

As may be recognized in FIGS. 1a to 2, the spindle drive apparatus 10 comprises a spindle 12 provided with an external thread, which is connected to a first connection unit 14 for connecting the spindle drive apparatus 10 to a superordinate assembly, i.e. one that does not belong the the spindle drive apparatus 10, such as a tailgate of a vehicle, for example, and a spindle nut 16 threadedly engaged with the external thread of the spindle 12, which nut is connected to a second connection unit 18 for connecting the spindle drive apparatus 10 to a superordinate assembly, i.e. one which does not belong to the spindle drive apparatus, such as a vehicle body, for example.

Figure 3:
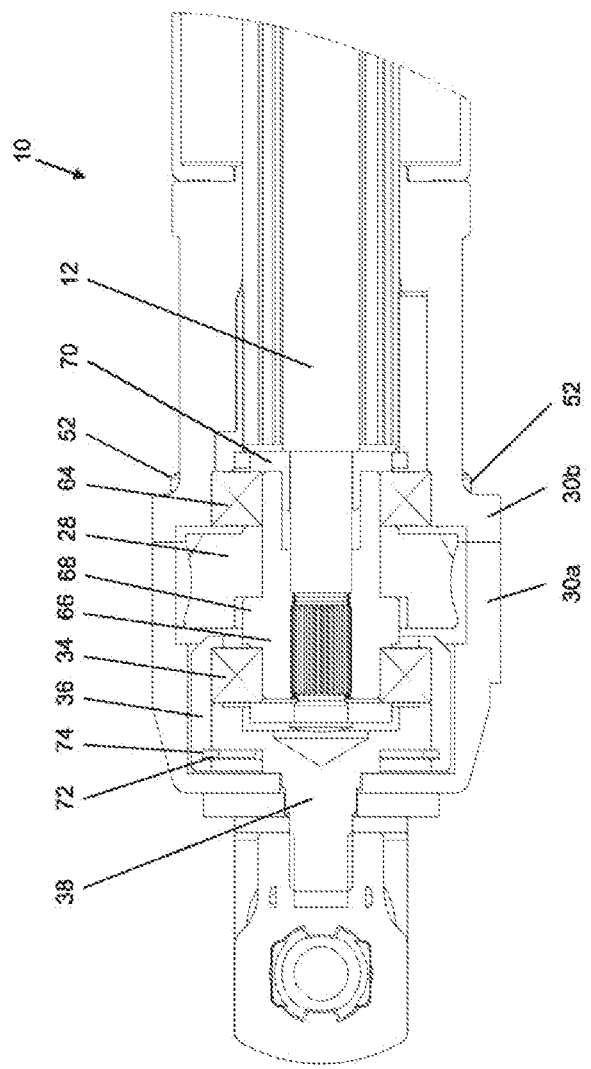
FIG. 3 shows a lateral cross-sectional view of a detail of the inventive spindle drive apparatus in a second embodiment.

It is already to be noted at this point that FIGS. 2 and 3 show a different or second embodiment of the inventive spindle drive apparatus 10, with respect to FIGS. 1a and 1b. Both embodiments differ however only with respect to the details of FIGS. 1a, 1b and 3, which are explained in the following.

Figure 4:
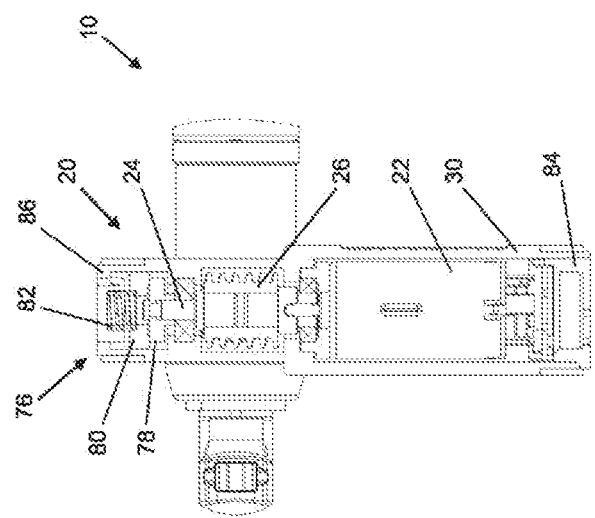
FIG. 4 shows a lateral cross-sectional view of a drive unit of an inventive spindle drive apparatus.

The spindle drive apparatus 10 also comprises a drive assembly 20, which is recognizable in part in the lateral cross-sectional view of FIG. 2 and in part in the cross-sectional view shown in FIG. 4. The drive assembly 20 comprises a drive unit 22, which is formed in this case by an electric motor and which is adapted for driving the spindle 12.

To this end, an output shaft 24 of the drive unit 22 carries a worm shaft 26, which in turn engages a drive gear 28, which is formed as a worm gear.

The drive gear 28 is connected, through a splined shaft 32 to the spindle 12 in a non-rotatable way.

The drive assembly 20 is housed within a drive assembly housing 30, which is made of plastics.

The drive gear 28 and the spindle 12 are supported by means of a bearing 34 relative to a cylindrical coupling element 36 and relative to the drive assembly housing 30.

The coupling element 36 connects the first connection unit 14 to the spindle 12, in such a way that a displacement of both these elements from each other is prevented in an axial direction of the spindle 12. In the example of FIG. 1a, the bearing 34 is a ball bearing, wherein the coupling element 36 engages with an external bearing ring of bearing 34 and connects the same, clamp-like, to a collar or a base 38, on which the first connection unit 14 is screwed by means of a thread 44. The coupling element 36 has to this end on both its longitudinal ends edges 40 and 42, which are deformed radially towards the inside. The base 38 and the bearing 34 are thus attached to each other by the coupling element 36. The base 38 may be made of metal, in particular steel.

A radially inner bearing ring of bearing 34 is secured to the spindle 12 by means of a support element 46, which is here formed by a metal disc. To this end, the left end, in FIG. 1a, of spindle 12 is formed like a cap, which axially secures the support element 46 and thus the bearing 34 and the drive gear 28 relative to the spindle 12.

As may be seen in FIG. 1b, a traction force, which acts between both superordinate assemblies connected to the spindle drive apparatus 10 and thus through both connection units 14 and 18 onto the spindle drive apparatus 10, is transmitted from the first connection unit 14 through the base 38, the coupling element 36, the bearing 34 and the support element 46 to the spindle 12.

A correspondingly opposed compression force between both superordinate assemblies acts from the spindle 12 through the drive gear 28, the bearing 34 and the base 38 on the first connection unit 14.

As shown in FIG. 2, these forces are directed on the right side of the spindle drive apparatus 10 from the spindle 12 through the spindle nut 16 and a steel tube 50 connected thereto to the second connection unit 18, which is connected to the steel tube 50.

Due to said force diagram, the drive assembly housing 30 is free from forces which are transmitted from one of the superordinate assemblies through the spindle drive apparatus 10 to the other of the superordinate assemblies.

The drive assembly housing 30 may thus be made of a light material, such as plastics, and may be free formed, without taking into account possible notch effects of the housing form.

The drive assembly housing 30 in the embodiments shown comprises a housing part 30a and a housing part 30b. Both housing parts 30a and 30b are fixed to each other by screws 52.

As an alternative or in addition to the screws 52, both housing parts 30a and 30b may also be connected to each other by means of joining methods, such as laser welding or gluing.

In the sectional lateral view of FIG. 2 it may be seen how the spindle nut 16 is threadedly engaged with the spindle 12.

Due to a rotation of the spindle 12, the spindle nut 16 is displaced according to the rotation direction and the type of thread of spindle 12 in FIG. 2 to the left or to the right, so that through the steel tube 50, the second connection unit 18 is displaced to or from the first connection unit 14.

The right end of spindle 12 in FIG. 2 is supported in the steel tube 50 by means of a guide ring 54, which may be made of plastics, such as POM.

The steel tube 50 is supported and housed in a guide tube 58 through a guide sleeve 56, which may be made of plastics, such as POM. The guide tube 58, which is concentrically arranged with respect to the spindle 12 and partially surrounds the same, may be made of metal, such as aluminum. The guide tube 58 is connected to the drive assembly housing 30 or a first enclosing tube 60. The spindle nut 16 is engaged with the inside of the guide tube 58 for example through longitudinal grooves, so that a torque support of the spindle nut 16 is provided by the guide tube 58. The spindle nut 16 may then move only in an axial direction of spindle 12 inside the guide tube 58.

In FIG. 2 it is also shown that the first connection unit 14 is connected to the first enclosing tube 60 and the second connection unit 18 is connected to a second enclosing tube 62, wherein the second enclosing tube 62 may telescopically enter the first enclosing tube 60.

Both enclosing tubes 60 and 62 may be made of plastics, in particular POM.

The embodiment shown in FIG. 3 of the spindle drive apparatus 10 differs from the previously described, to which express reference is made herewith, only in the following characteristics.

In addition to bearing 34, in the embodiment of the inventive spindle drive apparatus of FIG. 3 another bearing 64 is provided, which may improve the anti-frictional properties of the spindle. In order to compensate for temperature-dependent length variations of the corresponding components, the bearing is provided as a fixed bearing and the bearing 64 is a loose bearing.

An intermediate element 66 is also provided between the drive gear 28 and the spindle 12, which intermediate element is connected to the spindle 12 by torque-transmitting form fit through the splined shaft 32. The intermediate element 66 acts as a sort of adapter between the spindle 12 and bearings 34 and 64, so that the outer diameter of the spindle 12 in the region where both bearings 34 and 64 are arranged, may be expanded in such a way that standard-sized bearings may be used. The intermediate element 66 is also connected to the drive gear 28 by forming a torque-transmitting form fit.

The intermediate element 66 is provided with a protrusion 68, which axially secures the drive gear 28 and the bearing 64 on one side and the bearing 34 on the other side. The bearing 34 is axially secured on its other side through the support element 64 similarly to the embodiment of of FIG. 1a. The drive gear 28 is axially secured to the spindle, on its side opposite the protrusion 68 through the bearing 64 and in turn through a bushing 70, in particular to one shoulder thereof. The bushing 70 may also be replaced by a corresponding collar of spindle 12, although the use of the bushing 70 provides mounting advantages.

A further difference of embodiment of FIG. 3 is a spring ring 72, which engages with a groove 74 of the coupling element 36. The spring ring 72 fulfils the same function as the axial securing of base 38 and bearing 34 of the deformed edge 42 of coupling element 36, while providing the advantage that a corresponding forming step of the coupling element 36 may be omitted.

The sectional view of FIG. 4 shows a brake unit 76, which comprises a brake disc 78 with an adjacent brake pad 80. A compression spring 82 exerts a compression force on the brake pad 80, so that a corresponding friction fit is provided between the brake pad 80 and the brake disc 78. The brake unit 76 may increase the hysteresis of the drive unit 22 in such a way that the spindle drive apparatus 10 may also support in a not completely retracted state the own weight of a superordinate assembly acting on the spindle drive apparatus 10, such as a tailgate of a vehicle, so that it may not move unintentionally, i.e. without a controlled actuation of the spindle drive apparatus 10.

The brake unit 76 may be adapted in such a way that it acts only in one direction, i.e. for example by braking a compression of the spindle drive apparatus 10, while allowing an expansion of the spindle drive apparatus 10.

It is obvious that instead of said brake unit 76 provided as a friction brake, also other braking systems may be used, such as a magnetic brake unit 76.

It may be noticed that the output shaft 24 of the drive unit 22 is perpendicular to the spindle 12.

The part of the drive assembly housing 30 shown in FIG. 4 is partially integrated with the housing part 30a of the drive assembly housing 30 and is partially integrated with the housing part 30b of the drive assembly housing 30 (see FIG. 5) and comprises, on its upper and lower end in FIG. 4 a respective closing cap 84 and 86, in order to secure components, such as the drive unit 22, which are housed within the drive assembly housing 30.

Figure 5:
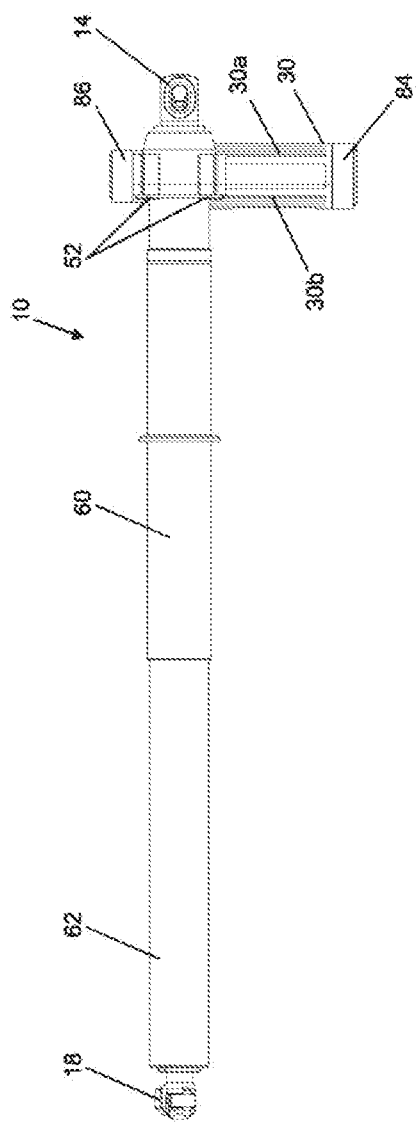
FIG. 5 shows a lateral view of the spindle drive apparatus.

FIG. 5 shows the spindle drive apparatus 10 in a non-sectioned lateral view. It may be noticed that the second connection unit 18 is connected to the enclosing tube 62 and the connection unit 14 is connected to the enclosing tube 60.

In particular in FIG. 5 it may be seen that the drive assembly housing 30, in particular the portion which houses the drive unit 22, is composed of the enclosing part 30a and 30b. Both enclosing parts 30a and 30b are connected to each other by means of screws 52.

As an alternative to the partition of FIG. 5 of the drive assembly housing 30, also a 90° rotated partition of the drive assembly housing 30 may be conceived, which extends, for example, at least in portions, along the sectional line IV-IV.

At the upper and lower end, in FIG. 5, of the portion of the drive assembly housing 30, which houses the drive unit 22, the closing caps 84 and 86 may be recognized.

Figure 6:
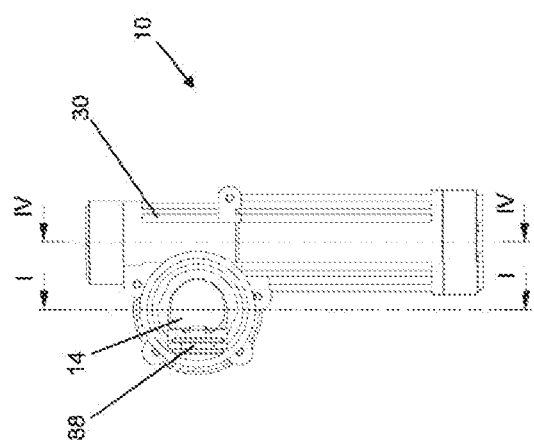
FIG. 6 shows a plan view in an axial direction relative to the spindle, wherein the sectional planes I-I and IV-IV of the sectional representations may be recognized.

FIG. 6 shows a plan view of the spindle drive apparatus 10 in a viewing direction parallel to the axis of spindle 12. The sectional plane I-I of the sectional views of FIGS. 1a to 3 and the sectional plane IV-IV of the sectional view of FIG. 4 may be recognized. It may also be seen that the spindle drive apparatus 10 or the drive assembly housing 30 are connected, through a supporting bracket 88 to the superordinate assembly, which is connected to the first connection unit 14, so that the spindle drive apparatus 10 or the drive assembly housing 30 is non-rotatably arranged with respect to this assembly, as is generally usual in such spindle drive apparatuses.

Said supporting bracket 88 may be made of metal, in particular steel.

The supporting bracket 88 may preferably comprise a through hole, which is aligned with a recess of the first connection unit 14, such as for connecting with a pin of the superordinate assembly.

The invention claimed is:

1. A spindle drive apparatus, comprising:
   a spindle provided with an external thread, the spindle being connected to a first connection unit for connecting the spindle drive apparatus to a superordinate assembly, which does not belong to the spindle drive apparatus,
   a spindle nut which is threadedly engaged with the external thread of the spindle and which is connected to a second connection unit for connecting the spindle drive apparatus to another superordinate assembly, which does not belong to the spindle drive apparatus,
   a drive assembly with a drive unit, which is adapted for driving the spindle or the spindle nut, an output shaft of the drive unit and a drive assembly housing, in which the drive assembly is housed,
   at least one bearing, which rotatably supports the spindle relative to the drive assembly housing, and
   a coupling element, which connects the first connection unit to the spindle in such a way that a displacement of the respective two elements from each other is prevented in at least one axial direction of the spindle, the coupling unit is separated from the drive unit and engages the at least one bearing and connects the at least one bearing to a collar for mounting of the first connection unit,
   wherein a traction force, which acts between both superordinate assemblies connected to the spindle drive apparatus, is transmitted from the first connection unit through the collar, the coupling element and the at least one bearing to the spindle,
   wherein a correspondingly opposed compression force between both superordinate assemblies acts from the spindle through the at least one bearing and the collar on the first connection unit,
   wherein the drive assembly housing is free from the traction and compression forces, which are transmitted from one of the superordinate assemblies through the spindle drive apparatus to the other of the superordinate assemblies.

2. The spindle drive apparatus of claim 1,
   wherein the coupling element connects the first connection unit the at least one bearing, wherein the bearing is connected, in an axially undisplaceable way, to the spindle.

3. The spindle drive apparatus of claim 1,
   wherein the coupling element has at least one inwardly protruding protrusion, which is adapted for axially securing components housed within the coupling element.

4. The spindle drive apparatus of claim 1,
   wherein the coupling element comprises at least one spring ring, which is adapted for axially securing components housed within the coupling element.

5. The spindle drive apparatus of claim 1,
   wherein the output shaft of the drive unit is essentially perpendicular to the spindle.

6. The spindle drive apparatus of claim 1,
   wherein the first connection unit is rotatably supported relative to the spindle or/and the second connection unit is rotatably supported relative to the spindle nut.

7. The spindle drive apparatus of claim 1,
   wherein the drive assembly housing is composed of a plurality of housing parts, which may be connected to each other, such that the drive assembly housing surrounds the drive assembly, the coupling element and at least a portion of the spindle.

8. The spindle drive apparatus of claim 1,
   wherein the spindle comprises a support element, which is connected to the spindle, and which axially secures the bearing with respect to the spindle.

9. The spindle drive apparatus of claim 1,
   wherein the spindle drive apparatus comprises a drive gear, which is connected to the spindle, on which the drive unit acts in such a way that a rotation of the drive gear rotates the spindle or the spindle nut.

10. The spindle drive apparatus of claim 9,
    wherein the drive gear is a worm gear, which is threadedly engaged with a worm shaft which is connected to the output shaft.

11. The spindle drive apparatus of claim 9,
    wherein the spindle drive apparatus comprises an intermediate element, which is connected, on one side, to the spindle or the spindle nut and on the other side to the drive gear and which is adapted for transmitting a torque of the drive gear to the spindle or to the spindle nut.

12. The spindle drive apparatus of claim 11,
    wherein the intermediate element is also adapted for housing at least one bearing on its external circumference.

13. The spindle drive apparatus of claim 11, wherein the intermediate element has at least one radially outwardly protruding protrusion, which is adapted for axially securing a bearing or/and the drive gear.

* * * * *